(12) United States Patent
Anumakonda et al.

(10) Patent No.: US 6,221,280 B1
(45) Date of Patent: Apr. 24, 2001

(54) CATALYTIC PARTIAL OXIDATION OF HYDROCARBON FUELS TO HYDROGEN AND CARBON MONOXIDE

(75) Inventors: Amarendra Anumakonda, Naperville, IL (US); Jean Yamanis, Morris Township, NJ (US); Joe Ferrall, Simi Valley, CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/175,125

(22) Filed: Oct. 19, 1998

(51) Int. Cl.$^7$ ................................ C07C 1/02; H01M 8/00
(52) U.S. Cl. ........................ 252/372; 252/373; 429/12; 429/13
(58) Field of Search .................. 48/202, 212; 252/373, 252/372; 429/12, 13

(56) References Cited

U.S. PATENT DOCUMENTS

| | | |
|---|---|---|
| 3,655,484 | 4/1972 | Patel . |
| 3,945,805 | 3/1976 | Costello . |
| 4,087,259 | 5/1978 | Fujitani . |
| 4,115,074 | 9/1978 | Yoshida . |
| 4,200,682 | 4/1980 | Sederquist . |

(List continued on next page.)

FOREIGN PATENT DOCUMENTS

| | | |
|---|---|---|
| 0-0225-143 | 6/1987 | (EP) . |
| 0-629-578 | 12/1994 | (EP) . |
| 1200448 | 7/1970 | (GB) . |
| WO96/04200 | 8/1995 | (WO) . |

OTHER PUBLICATIONS

S. Ahmed et al., "Partial Oxidation Reformer Development For Fuel Cell Vehicles," Proceedings of the 32$^{nd}$ Intersociety Energy Conversion Engineering Conference, v.2, pp. 843–846 (1997).

J. Bentley et al., "Reformer and Hydrogen Storage Development For Fuel Cell Vehicles," Annual Automotive Technology Development Contractor's Coordination Meeting (1995).

British Gas PLC, "Evaluation of the Potential Use of Partial Oxidation in Solid Polymer Fuel Cell Systems" (1997).

L. Brown, "Survey of Processes for Producing Hydrogen Fuel from Different Sources for Automotive–Propulsion Fuel Cells," Los Alamos National Laboratory (1996).

Chementator (date unknown).

(List continued on next page.)

*Primary Examiner*—Steven P. Griffin
*Assistant Examiner*—Eileen E. Nave
(74) *Attorney, Agent, or Firm*—William J. Zak, Jr. Esq.

(57) ABSTRACT

A method of processing sulfur-containing heavy hydrocarbon fuels in the substantial absence of steam through catalytic partial oxidation is described. The process comprises the steps of vaporizing a heavy hydrocarbon fuel and bringing the vaporized fuel and oxidizer mixture in contact with a noble metal catalyst supported on an open channel structure. The hydrocarbon fuel is considered to be a liquid hydrocarbon having at least six carbon atoms and a sulfur content of at least 50 ppm. The feed, containing only the vaporized fuel and oxygen in the oxidizer mixture, is subsequently routed through a reactor containing a noble metal catalyst (typically Rh/Alumina) at contact times of not more than about 500 milliseconds and a LHSV of not less than about 0.5 h$^{-1}$. The feed is partially oxidized by a catalytic reaction occurring at a temperature of no less than about 1050° C., with the catalytic partial oxidation process producing essentially complete conversion of hydrocarbons present in the feed to hydrogen and carbon monoxide. The sulfur compounds in the feed are predominantly converted into hydrogen sulfide. The product gas consisting mainly of carbon monoxide and hydrogen can then be recovered or, alternatively, directed to a solid oxide fuel cell system.

28 Claims, 6 Drawing Sheets

U.S. PATENT DOCUMENTS

| | | |
|---|---|---|
| 4,244,811 | 1/1981 | Grenoble . |
| 4,379,109 | 4/1983 | Simpson . |
| 4,381,187 * | 4/1983 | Sederquist ............................ 48/212 |
| 4,483,691 * | 11/1984 | McShea, III et al. ................. 48/202 |
| 4,522,894 | 6/1985 | Hwang . |
| 4,778,484 | 10/1988 | Najjar . |
| 4,789,384 | 12/1988 | Martens . |
| 4,844,837 | 7/1989 | Heck . |
| 4,913,982 | 4/1990 | Kotchick . |
| 5,421,842 | 6/1995 | Shabaker . |
| 5,486,313 | 1/1996 | De Jong . |
| 5,510,056 | 4/1996 | Jacobs . |
| 5,639,401 | 6/1997 | Jacobs . |
| 5,648,582 | 7/1997 | Schmidt . |
| 5,654,491 | 8/1997 | Goetsch . |
| 5,658,497 | 8/1997 | Kumar . |
| 5,720,901 | 2/1998 | De Jong . |

OTHER PUBLICATIONS

A. Dicks, "Hydrogen generation from natural gas for the fuel cell systems of tomorrow," Journal of Power Sources, v. 61, pp. 113–124 (1996).

N. Edwards et al., "Fuel Cell System for Transport Applications including On–board HotSpot™ Reformer," Johnson Matthey Technology Centre, Blount's Court, Sonning Common, Reading RG4 9NH, United Kingdom.

Elangovan et al., "Planar solid oxide fuel cell integrated system technology development," Journal of Power Sources, v. 71, pp. 354–360 (1998).

D. Goetsch et al., "Microsecond Catalytic Partial Oxidation of Alkanes," Science, v. 271, pp. 1560–1562 (1996).

T. Hirata et al., "Development of 60kW Class Plate Reformer for Fuel Cell Plant," IHI Engineering Review, v. 29, No. 2, pp. 53–58 (1996).

W. Houghtby et al., "Development of the Adiabatic Reformer to Process No. 2 Fuel Oil and Coal Derived Liquid Fuels" (1981).

Komiyama, "Design and Preparation of Impregnated Catalysts," Catal. Rev. 27, 341 (1985).

Lee et al., "Removal of Sulfur Contaminants in Methanol for Fuel Cell Applications," Fuel Cell Seminar Poster Session, (1996).

A.D. Little, "Fuel Cell Powerplant System Considerations" (1996).

A.D. Little, Advancing Fuel Cell Technology for the Transportation Industry (date unknown).

G. Purohit et al., "Gasification of Diesel Fuel for a Low–Emission, High–Efficiency Engine System," SAE Technical Paper Series (1980).

L. Schmidt et al. "Partial oxidation of $CH_4$ and $C_2H_6$ over noble metal–coated monoliths," Catalysis Today, v. 21, pp. 443–454 (1994).

M. Stephanopoulos et al., "Conversion of Hydrocarbons for Fuel Cell Applications," JPL Publication 82–37 (1981).

* cited by examiner-

CATALYTIC PARTIAL OXIDATION OF HYDROCARBON FUELS TO HYDROGEN AND CARBON MONOXIDE

BACKGROUND OF THE INVENTION

The present invention relates to methods of catalytic partial oxidation (CPOX) of hydrocarbon fuels and, more particularly, to improved methods of CPOX of heavy hydrocarbon fuels having a substantial sulfur content, such as commercial and logistic fuels.

Interest continues in methods of using hydrocarbon fuels to produce a gaseous product stream of hydrogen and carbon monoxide, as well as using the gaseous product stream to fuel a fuel cell system, such as a solid oxide fuel cell system (SOFC). The studies concerning hydrocarbon processing vis-a-vis fuel cells have been numerous and include S. Ahmed et al., "Partial Oxidation Reformer Development For Fuel Cell Vehicles," Proceedings of the $32^{nd}$ Intersociety Energy Conversion Engineering Conference, v.2, pp. 843–846 (1997); J. Bentley et al., "Reformer and Hydrogen Storage Development For Fuel Cell Vehicles," Annual Automotive Technology Development Contractor's Coordination Meeting (1995); British Gas plc, "Evaluation of the Potential Use of Partial Oxidation in Solid Polymer Fuel Cell Systems" (1997); L. Brown, "Survey of Processes for Producing Hydrogen Fuel from Different Sources for Automotive-Propulsion Fuel Cells," Los Alamos National Laboratory (1996); N. Edwards et al., "Fuel Cell System for Transport Applications including On-board HotSpot™ Reformer," Johnson Matthey Technology Centre, Blount's Court, Sonning Common, Reading RG4 9NH, United Kingdom; Elangovan et al., "Planar solid oxide fuel cell integrated system technology development," Journal of Power Sources, v. 71, pp.354–360 (1998); and T. Hirata et al., "Development of 60 kW Class Plate Reformer for Fuel Cell Plant," IHI Engineering Review, v. 29, no. 2, pp. 53–58 (1996).

The processes of converting hydrocarbon fuels to hydrocarbon/carbon monoxide gas products that have been developed in the past generally fall into one of three classes—steam reforming, partial oxidation (catalytic and non-catalytic), and auto-thermal reforming (a combination of steam reforming and partial oxidation). All three hydrocarbon conversion methods have been considered for use in conjunction with fuel cells, although L. Brown, supra, suggests that partial oxidation alone has not been favored. Nevertheless, the contemplated uses of fuel cells have been many, but significant attention has recently been given to transport vehicles. In that regard, fuel cells have been considered as replacements for internal combustion engines due to the advantages of greater efficiency and reduced emissions.

Despite their advantages, each of the three hydrocarbon conversion processes has design barriers. In the steam reforming method, which is endothermic, there are space and weight issues. Because steam reforming involves an endothermic reaction, an external source of heat is needed and the required heat transfer processes are slow. Of course, with the need for steam comes a concomitant need for a water supply or recycling. Any such additional items only add to the size and weight of a vehicle that can, in turn, affect other design considerations.

On the other hand, partial oxidation is an exothermic process and, therefore, does not have the disadvantage of requiring heat input and related transfer inefficiencies. There has been progress in the partial oxidation of light hydrocarbons (i.e., molecules with up to 5 carbon atoms) in recent years. But the technology for the conversion of complex or heavy hydrocarbon fuels (molecules with greater than 5 carbon atoms) to hydrogen and carbon monoxide is still in its early development.

Of great interest for fuel cells is the conversion of refinery liquid hydrocarbon fuels, such as gasoline and naphtha, to hydrogen/carbon monoxide gas streams by partial oxidation processes. Gasoline typically has a minimum of 80%–90% hydrocarbons with greater than five or more carbon atoms per molecule. For military applications, the hydrocarbon fuels of greatest interest are the so-called logistic fuels, such as JP-8 jet fuel, JP-4 jet fuel, JP-5 jet fuel and No. 2 fuel oil. In logistic fuels, the number of carbon atoms in a molecule may typically range from at least six and up to about 20 or more. But higher numbers of carbon atoms tend to increase the potential problem of carbon formation in the conversion process.

Carbon formation arises from the thermal cracking of hydrocarbons that can produce carbon-rich compounds (i.e., carbonaceous polymers) and, ultimately, coke. Thereby, system degradation can occur by, among other things, deposition of carbon on catalysts. In turn, the carbon deposition can lead to catalyst deactivation. Deposition on reactor walls can affect reactor performance and may lead to plugging. The problem of carbon formation has been extensively addressed in the past. Examples can be found in A. Dicks, "Hydrogen generation from natural gas for the fuel cell systems of tomorrow," Journal of Power Sources, v. 61, pp. 113–124 (1996); and W. Houghtby et al., "Development of the Adiabatic Reformer to Process No. 2 Fuel Oil and Coal Derived Liquid Fuels" (1981).

In addition to carbon formation, the processes for liquid hydrocarbon fuel conversion to hydrogen/carbon monoxide gas streams may be affected by the sulfur that is usually present in these fuels. In both light and heavy hydrocarbon fuels, but particularly the latter, sulfur is present in varying amounts. The specifications for sulfur content in logistic fuels such as Jet A, JP-8, JP-4, JP-5, etc. is given by military specification MIL-T-5634M/N. These specifications require the maximum amount of total sulfur content in the fuel to be 0.3 wt. % (tested according to standardized methods D1266/D1522/D2622). Typically, however, commercially available jet fuels have a total sulfur content of about 0.05–0.07 wt. %. The compounds of sulfur which remain in the liquid refinery streams are usually the refractory benzothiophene, dibenzothiophene, and their derivatives [Lee et al. "Removal of Sulfur Contaminants in Methanol for Fuel Cell Applications," Fuel Cell Seminar Poster Session, (1996)], which are essentially difficult to remove. As with carbon formation, sulfur can poison the catalyst and do so to a point where the catalyst becomes completely deactivated. Catalysts based upon nickel or platinum have appeared to be particularly susceptible to poisoning. It has been postulated that sulfur forms surface stable compounds with the catalyst. Thereby, catalyst active sites for oxidation are depleted and efficient production of hydrogen and carbon monoxide through catalytic partial oxidation is hindered.

One potential solution to the presence of sulfur has been to remove the sulfur prior to processing. Nickel or other transition metals, such as iron, have been known to remove sulfur from sulfur bearing organic compounds and are used in the laboratory. They have also been used as adsorbents to remove the thiophenic sulfur that remains in hydrocarbon fuels after hydro-desulfurization. These metals are very active for sulfur removal but suffer from the inability to adsorb a large quantity of sulfur because adsorption is limited only to the external surface of the metal due to the large size of the thiophenic molecule. Of these transition metals, Raney nickel seems to offer the best choice because of its high surface area. But experimental data shows that a ratio of about 100:1 by weight of Ni:S is needed for complete removal of the residual thiophenic sulfur from jet and diesel fuels. The required high Ni to S ratio limits this method of desulfurization to fuels with very small concentrations of sulfur, i.e., a few ppm of sulfur. For the removal of sulfur from logistic fuels that have hundreds of ppm of sulfur, desulfurization by nickel is costly and demanding in terms of metal weight and volume and, therefore, this method is impractical.

A solution around the sulfur problem in partial oxidation has been to omit the catalyst entirely (i.e., non-catalytic partial oxidation), particularly for converting heavy hydrocarbons on an industrial scale, and removing the sulfur, if necessary, after the partial oxidation reactor. But doing so trades process efficiencies, shorter processing times and milder temperature regimes provided by a catalyst for sulfur tolerance relative to the partial oxidation reactor. A general discussion of sulfur problems in reforming is found in A. D. Little, "Fuel Cell Powerplant System Considerations" (1996); and M. Stephanopoulos et al., "Conversion of Hydrocarbons for Fuel Cell Applications," JPL Publication 82-37 (1981).

In terms of further potential design problems associated with the catalyst, the catalyst has usually been a metal supported on some material. The supporting material has the potential for affecting heat transfer during and after the exothermic oxidation reaction. Providing a less than optimum heat transfer can lead to system performance degradation. For example, in pellet catalyst beds used in the past, hot spots and non-reactive regions can exist. With an open channel structure such as a honeycomb monolith, on the other hand, the connecting walls provide more uniform temperature than the pellet bed. Also, the monolith can respond faster to load changes due to its better heat transfer properties. Some of the monoliths have been constructed of metal or ceramic. Discussions of catalysts are found in U.S. Pat. Nos. 5,658,497; 5,639,401; 5,510,056; and 4,844,837.

Given the many potential design barriers to catalytic partial oxidation, it is not surprising that most of the research has been in the area of very light hydrocarbons ($C_1$ to $C_5$ hydrocarbons), which are easier to reform in comparison to heavy hydrocarbons. One example of light hydrocarbon processing by CPOX includes D. Goetsch et al., "Microsecond Catalytic Partial Oxidation of Alkanes," Science, v. 271, pp.1560–1562 (1996). Therein, a single layer, Pt-10% Rh gauze was used in a reactor with contact times as short as 10 microseconds to partially oxidize ethane, propane, butane and iso-butane to olefins and oxygenates. U.S. Pat. No. 5,654,491 is related to the above.

In another example of converting very light hydrocarbons by CPOX, L. Schmidt et al. "Partial oxidation of $CH_4$ and $C_2H_6$ over noble metal-coated monoliths," Catalysis Today, v.21, pp.443–454 (1994) describe the use of a noble metal film, such as rhodium, on a monolith catalyst of alpha-alumina foam to produce syngas, i.e., hydrogen/carbon monoxide mixtures. Metal loading was from about 1 to 20 wt. %. Contact time between the feed and catalyst ranged from about $10^{-4}$ to $10^{-2}$ seconds while operating at about 1000° C. in pure oxygen gas. No steam was used in the process. With a methane fuel to oxygen ratio of to 2:1, Schmidt et al. reported 90% syngas production. In a related fashion is U.S. Pat. No. 5,648,582 wherein L. Schmidt et al. indicate that catalyst composition is the critical factor in CPOX, as opposed to mass transfer rate.

Additional examples of light hydrocarbon conversion by CPOX and other methods are found in U.S. Pat. Nos. 5,720,901; 5,486,313; 5,421,842; 4,789,384 and European Patent App. No. 0-0225-143.

In contrast to very light hydrocarbons, a heavier hydrocarbon fuel—JP-8 jet fuel—was partially oxidized to fuel an SOFC in S. Elangovan et al., supra. The JP-8 fuel was apparently considered to have a sulfur content of about 0.3 wt. %. The depicted system includes the use of steam, a soot filter downstream of the reactor and a desulfurizer downstream of the soot filter. The prediction was that the system would achieve a 75% cold gas efficiency, i.e., higher heating value of ($H_2$+CO) products/higher heating value of feedstock.

Another example of heavy hydrocarbon processing is shown in U.S. Pat. No. 4,087,259 wherein a rhodium catalyst on spherical gamma alumina catalyst carrier packed in a packed bed configuration was used to process gasoline and naphtha, although other hydrocarbons were mentioned as being suitable. No specifics of a sulfur content, if any, in the hydrocarbon were given. The rhodium was present at about 0.0005 to 1.0 wt. %, with a concentration in excess of 1.0 wt. % providing no increase in catalytic activity. A reaction temperature of about 690° C. to 900° C. was maintained. Above about 900° C., thermal decomposition occurred and was stated to be a prohibited temperature regime. The liquid hourly space velocity (LHSV) for the partial oxidation was kept at about 0.5 to 25 $h^{-1}$. A carbon to oxygen ratio was maintained at about 0.7 to 1.8.

Further examples of heavy hydrocarbon processing by non-catalytic partial oxidation, catalytic partial oxidation, gasification, and other methods are found in U.S. Pat. Nos. 4,778,484; 4,522,894; 4,244,811; and 4,115,074.

A catalytic partial oxidation process for the conversion of heavier hydrocarbon fuels, and especially logistic fuels, to hydrogen/carbon monoxide is needed which can operate in the substantial absence of steam, thereby simplifying the overall system design. In particular, there is a need for a method of processing heavy hydrocarbons having a number of carbons in excess of five. Additionally, there is a need for a heavy hydrocarbon fuel processing catalytic partial oxidation process that can provide a lightweight, compact, robust and durable source of hydrogen and carbon monoxide that could be used to fuel a solid oxide fuel cell system. A CPOX process is also needed which can overcome the tendency of carbon formation from heavy hydrocarbons. There is also a need for the catalytic partial oxidation of hydrocarbon fuels having a substantial sulfur content, i.e., sulfur in excess of about 50 ppm by weight, without substantial catalyst deactivation. At the same time, a catalytic partial oxidation process is needed which can maintain desired operating performance in the presence of sulfur. Additionally, there is a specific need for such a process that can take place in the substantial absence of desulfurization prior to the oxidation reaction. A further need is for a CPOX process which can reform heavy hydrocarbons with substantial sulfur over an extended period of time, while maintaining a desired steady-state yield efficiency.

As can be seen from the above discussions, there is a substantial need for an improved method of CPOX and a method of supplying a hydrogen/carbon monoxide fuel to a fuel cell system, such as a solid oxide fuel cell system.

SUMMARY OF THE INVENTION

It is an object of the present invention to provide a process for the catalytic partial oxidation of sulfur-containing, heavy hydrocarbons to a gaseous product which is rich in hydrogen and carbon monoxide, by reacting the hydrocarbons with an oxidizer gas in the presence of a catalyst. The process provides for the preparation of a feed gas mixture comprising an oxygen containing gas and a sulfur-containing, heavy hydrocarbon fuel; and passing the feed gas mixture through a catalytic structure which comprises a noble metal supported on an open-channel support, with the catalytic structure being maintained at a temperature greater than about 1050° C. to produce a gaseous stream which is rich in hydrogen and carbon monoxide.

Hereinafter, a "heavy hydrocarbon" is defined as a hydrocarbon molecule having at least 6 carbon atoms, and a "heavy hydrocarbon fuel" is defined as a liquid mixture of heavy hydrocarbons. Sulfur in heavy hydrocarbon fuel may be present as inorganic or organic compounds that are dissolved in the fuel. In addition to sulfur, heavy hydrocarbons may have other heteroatoms in their molecules, such as oxygen, nitrogen, chlorine, other non-metals and metals. A "catalytic structure," which comprises a noble metal supported on an open-channel support, will also be referred to as a "noble metal catalyst." The catalytic structure may also be a noble metal mesh.

It is another object of the present invention to provide a process for the conversion of sulfur-containing, heavy hydrocarbons to a gas product, which is rich in hydrogen and carbon monoxide, by reacting the hydrocarbons with an oxidizer gas in the presence of a catalyst and in the substantial absence of water in the hydrocarbons or the oxidizer gas. The process provides for the preparation of a feed gas mixture comprising an oxygen containing gas and a sulfur-containing, heavy hydrocarbon fuel, with the feed gas mixture being substantially free of water; and passing the feed gas mixture through a catalytic structure which comprises a noble metal supported on an open-channel support, with the catalytic structure being maintained at a temperature greater than about 1050° C. to produce a gaseous stream which is rich in hydrogen and carbon monoxide.

It is another object of this invention to convert commercially available heavy hydrocarbon fuels such as gasoline, kerosene, jet fuels, and diesel fuels to hydrogen and carbon monoxide by reacting the fuels with an oxidizer gas in the presence of a noble metal catalyst.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the noble metal being selected from the group of Rh, Pt, Pd, and Ir.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the noble metal preferably being rhodium.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the oxidizer gas being air.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the oxidizer gas being oxygen-enriched air.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the oxidizer gas being oxygen.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the noble metal being supported on porous alumina honeycombs, ceramic honeycombs, or ceramic-coated metal honeycombs.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the catalyst being in an amount ranging from about 5 to 30 wt. % based on the support.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the oxidizer gas being used at such an amount that the ratio of the atomic carbon flow rate corresponding to the hydrocarbon fuel and the atomic oxygen flow rate corresponding to the oxidizer gas is no less than about 0.5.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst, with the fuels having a sulfur content greater than about 50 ppm by weight.

It is another object of the present invention to provide a process for the conversion of sulfur-containing, liquid hydrocarbon fuels to a gas product, which is rich in hydrogen and carbon monoxide, by reacting the fuels in the substantial absence of water with an oxidizer gas in the presence of a noble metal catalyst, with the process taking place with substantially no formation of elemental carbon or coke.

It is another object of the present invention to provide a process for the conversion of sulfur-containing, liquid hydrocarbon fuels to a gas product, which is rich in hydrogen and carbon monoxide, by reacting the fuels with an oxidizer gas in the presence of a noble metal catalyst at contact times not greater than about 500 milliseconds, and the liquid hourly space velocity (LHSV) is no less than about 0.5 $h^{-1}$.

Also provided by the present invention is a method of supplying a gas mixture containing hydrogen and carbon monoxide as fuel to a solid oxide fuel cell system, with the gas mixture being produced by a process of catalytic partial oxidation of heavy hydrocarbons. The process provides for the preparation of a feed gas mixture comprising an oxygen containing gas and a sulfur-containing, heavy hydrocarbon fuel; passing the feed gas mixture through a catalytic structure, which comprises a noble metal supported on an open-channel support, with the catalytic structure being maintained at a temperature greater than about 1050° C. to produce a reaction product gas mixture, which is rich in hydrogen and carbon monoxide; and the reaction product gas mixture being fed to a solid oxide fuel cell system.

These and other features, aspects and advantages of the present invention will become better understood with reference to the following drawings, description and claims.

DETAILED DESCRIPTION OF THE INVENTION

Figure 1:
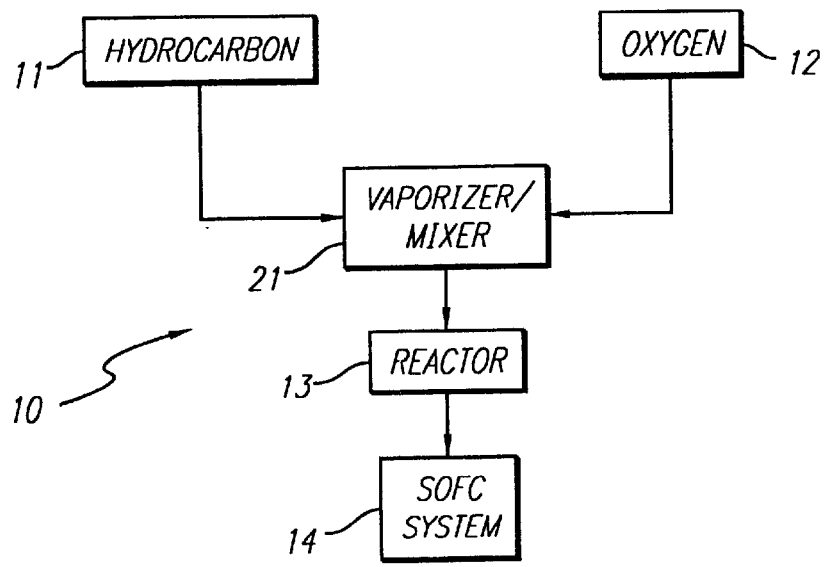
FIG. 1 is a schematic diagram of a fuel system for a solid oxide fuel cell system according to an embodiment of the present invention.

The present invention provides a process for the catalytic partial oxidation of sulfur-containing, heavy hydrocarbons to a gaseous product, which is rich in hydrogen and carbon monoxide, by reacting the hydrocarbons with an oxidizer gas in the presence of a catalyst.

The process of this invention provides for the preparation of a feed gas mixture, which consists of a sulfur-containing heavy hydrocarbon fuel and an oxygen-containing gas. The feed gas mixture is then passed through a supported noble metal catalyst, which is maintained at a temperature greater than about 1050° C., to produce a gaseous stream, which is rich in hydrogen and carbon monoxide. The following are some of the advantages of the present invention over the prior art: stable operating conditions in the presence of sulfur; absence of carbon formation in the substantial or essential absence of water in the feed gas mixture; high yields of carbon monoxide and hydrogen; very fast reaction rates and, therefore, small reactor volumes; and conversion of the sulfur compounds in the hydrocarbon fuel to hydrogen sulfide, which can be easily removed from the gaseous stream by existing gas clean up technologies.

Hereinafter, a "heavy hydrocarbon" is defined as a hydrocarbon molecule having at least 6 carbon atoms, and a "heavy hydrocarbon fuel" is defined as a liquid mixture of heavy hydrocarbons. Sulfur in heavy hydrocarbon fuels may be present as inorganic or organic compounds that are dissolved in the fuel. In addition to sulfur, heavy hydrocarbons may have other heteroatoms in their molecules, such as oxygen, nitrogen, chlorine, other non-metals and metals. A "catalytic structure," which comprises a noble metal supported on an open-channel support, will also be referred to as "noble metal catalyst."

In this embodiment of the invention, the catalytic structure or catalyst employed for the partial oxidation of hydrocarbons is in the form of a noble metal deposited on an open-channel support. The manner of constructing such a catalyst is well known in the art and is shown, for example, by Komiyama in "Design and Preparation of Impregnated Catalysts," Catal. Rev. 27, 341 (1985). The preferred noble metals include rhodium, platinum, palladium, and iridium. A more preferred metal is rhodium because of the lower stability of its sulfide compounds at high temperature, high catalytic activity towards CPOX, and lower vapor pressure at operating temperature. The weight percentage or metal loading of the catalyst usefully ranges from about 5 to 30 wt. % based on the support, and preferably from about 10 to 25 wt. %. A more preferred metal loading is about 20 wt. %.

While porous alpha alumina is used in the examples of this invention as the open-channel support, other materials, such as cordierite, zirconia, stabilized gamma alumina, and metals coated with chemically inert ceramic coatings can be used. Similarly, configurations in addition to a honeycomb monolith can be used. For example, the noble metal may used in a mesh form or may be a coating on a metallic mesh. In general, configurations that provide an open channel type structure or a substantially non-tortuous path while maintaining efficient heat transfer can be used.

Figure 2:
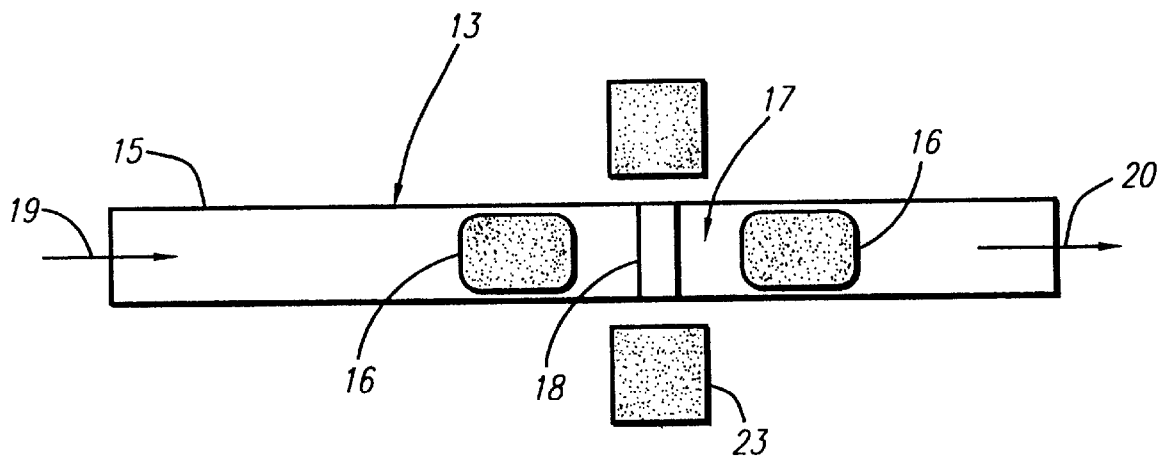
FIG. 2 is a schematic diagram of a catalytic partial oxidation reactor according to an embodiment of the present invention and which can be utilized in the system of FIG. 1.

For one aspect of the present invention, FIG. 1 schematically depicts a fuel system 10 that can be employed to carry out the steps or acts of the present invention. In general, the present invention provides for a hydrocarbon feed to be processed by catalytic partial oxidation (CPOX). The hydrocarbon feed can comprise a heavy hydrocarbon fuel containing a substantial amount of sulfur. Thereby, and in the substantial absence of steam and/or desulfurization, the fuel system 10 can produce a reaction product gas stream comprising hydrogen and carbon monoxide as the main reaction products. In turn, the product gas can be used as a fuel for a fuel cell system 14, either directly or after treatment for desulfurization or temperature compatibility by routing it to a fuel cell system such as a solid oxide fuel cell system (SOFC). The fuel system 10 preferably incorporates a CPOX fuel processor or reactor 13 for performing the step or act of catalytically reacting the feed. The reactor 13 is schematically depicted in FIG. 2.

In further describing the fuel system 10, as well as the steps according to the present invention, a hydrocarbon fuel source 11 is provided as a source for a variety of hydrocarbons that are to be converted predominantly into hydrogen and carbon monoxide as main reaction products. The mixture of hydrogen and carbon monoxide is oftentimes referred to as syngas. The present invention is particularly advantageous when the hydrocarbon fuels are "heavy hydrocarbons" and have a "substantial amount of sulfur" content. Some heavy hydrocarbon fuels include gasoline and kerosene. When reference is made to the term "substantial amount of sulfur," it is intended to mean sulfur that is present in an amount of at least about 50 ppm. This sulfur can be in the form of inorganic sulfur compounds such as hydrogen sulfide, carbonyl sulfide, carbon disulfide etc., or organic sulfur compounds such as mercaptans and thiophenic compounds including benzothiophene, dibenzothiophene and their derivatives. Such sulfur compounds are some of the most refractory sulfur compounds found in commercial heavy hydrocarbons such as diesel and jet fuels (Lee et al., supra). Some examples of heavy hydrocarbon fuels having a substantial amount of sulfur include logistic fuels such as JP-8 fuel, JP-5 fuel, JP-4 fuel, No.2 fuel oil and diesel fuel. Notwithstanding the foregoing, while "heavy hydrocarbon fuels" oftentimes contain a "substantial amount of sulfur," the present invention contemplates that "heavy hydrocarbon fuels" may not have a "substantial amount of sulfur." Likewise, a hydrocarbon having a "substantial amount of sulfur" may not be a "heavy hydrocarbon fuel."

With the hydrocarbon source 11 containing heavy hydrocarbons or a heavy hydrocarbon fuel that may have a sulfur content, a vaporizer/mixer 21 is preferably provided downstream of the hydrocarbon source 11. The vaporizer/mixer 21 is for carrying out the step or act of vaporizing the hydrocarbons since they will substantially be in liquid form at room temperature. Also, in the vaporizer/mixer 21, the vaporized hydrocarbon undergoes the step or act of mixing with an oxidizer gas flowing from an oxidizer gas source 12. The vaporizer/mixer 21 can be of any design known in the art that can vaporize a liquid, such as spray nozzle atomizers, vaporizers, or pre-heated packed bed vaporizers. Once vaporized and mixed, the hydrocarbons can be routed to the CPOX reactor 13.

The oxidizer gas source 12 provides an oxygen containing gas, i.e., a source of oxygen which serves as the oxidant in the oxidative reaction that will occur in the CPOX reactor 13, as further described below. The present invention preferably uses air in the oxidizer gas source 12 because of cost and availability. Nevertheless, enriched air, pure oxygen or any other oxidizer source containing oxygen (atomic or molecular) can be utilized. Irrespective of what type of oxygen used, the oxidizer gas flows through a valve or other suitable metering means (not shown). In turn, the valve means provides a regulated flow rate of oxidizer gas to the vaporizer/mixer 21.

The regulated flow rates of both hydrocarbon fuel and oxidizer gas are provided to generally regulate the carbon to oxygen ratio. More specifically, the regulated flow rates enable regulation of a molar ratio of carbon atoms to oxygen atoms, with the number of carbon atoms being determined from the carbon content of the hydrocarbon fuel. The number of oxygen atoms is based upon the concentration of oxygen in the oxidizer gas.

As is known in the art, the carbon to oxygen (C/O) ratio can affect various aspects of a CPOX process, including hydrogen and carbon monoxide yields and carbon formation. In the present invention, it is useful to have a C/O ratio of not less than about 0.5. Preferably, the C/O ratio is from about 0.5 to 1.0, and more preferably about 0.6 to 0.8. Below a C/O ratio of about 0.5, deep oxidation tends to occur, leading to complete as opposed to partial combustion of the hydrocarbon to carbon dioxide and water. Above a C/O ratio of about 1.0, incomplete combustion, coke formation, and side reactions may tend to occur.

Upon the regulated flow rates of hydrocarbon and oxygen being subject to the step of vaporizing/mixing, a feed gas mixture 19 is formed comprising the hydrocarbon fuel and oxygen. Then, a step or act of routing the feed 19 into the reactor 13 occurs. A feed flow rate or rate at which the feed 19 is flowed into the reactor 13 is controlled by a mass flow controller (not shown) in this embodiment. However, other devices equivalent to a mass flow controller can be used, such as rotameters and needle valves. As appreciated by those skilled in the art, the feed flow rate can affect a CPOX process, for example, in terms of catalytic contact time, i.e., duration of contact between the feed 19 and a catalyst 18 within the reactor 13. The catalyst contact time is the ratio of the volumetric gas flow rate to the catalyst volume. The volumetric gas flow rate is the sum of the oxidizer gas and the vaporized hydrocarbon flow rates at standard conditions, assuming that the hydrocarbons are in the gas phase. For the open channel structure used as the catalyst support, the catalyst volume is taken as the cylindrical space in the reactor occupied by the open channel structure. Also affected by the feed flow rate is heat transfer and mass transfer limitations of the reactor 13. In general, the feed flow rate can vary with the size of the reactor 13 and the delivery rate of the feed 19. Yet, the preferred feed flow rate in the present invention is largely dictated by a preferred catalytic contact time, as discussed below.

As better seen in FIG. 2, the reactor 13 into which the feed 19 is routed includes a reactor or exterior wall 15 which is of a cylindrical shape in this embodiment. The exterior wall 15 may be constructed of quartz or other materials, which can withstand temperatures up to about 1300° C. and are substantially chemically inert to hydrocarbon oxidation or carbon formation. These other materials can include quartz-lined steel, high temperature ceramics, ceramic metal composites, nickel based superalloys, cobalt based superalloys, and, in general, high temperature metals and metals protected by ceramic coatings. Within the exterior wall 15 is a pair of radiation shields 16 to contain heat within a catalytic reaction zone 17, as well as to allow the feed 19 to pass through the reactor 13. The shields 16 are configured in the shape of cylindrical plugs and made of a high temperature ceramic with an appreciable void volume (i.e., porosity) in this embodiment. The shields 16 can be made of materials such as zirconia, alumina, and cermets. The shields 16 are shown in FIG. 2 as being upstream and downstream of the reactor 13. However, the shields 16 may also usefully be placed so as to surround or encase the reactor 13.

As mentioned above, the shields 16 define the area of a catalytic reaction zone 17 where the partial oxidation reaction occurs. Further provided by the shields 16 is a means for maintaining a catalytic reaction temperature within the catalytic reaction zone 17. Unless the reaction zone 17 is at a particular reaction temperature, the partial oxidation reaction cannot be initiated. Therefore, the reaction temperature within the reaction zone 17 is initially provided by a furnace 23 disposed about the exterior of the reactor 13 and immediately adjacent the reaction zone 17. In this embodiment, the furnace 23 is in the form of a cylindrical heating element with insulation, although other known methods of heating can be used. Not only is the furnace 23 used to create a desired reaction temperature, it also assists in maintaining a substantially adiabatic condition with the reaction zone 17 by controlling heat losses to the surroundings.

However, a particular reaction temperature may have deleterious effects on CPOX processing, such as sulfur formation on the catalyst, incomplete oxidation, and by-product formation. To achieve the desired effects of the reaction temperature while seeking to avoid the deleterious effects, the reaction temperature is usefully maintained in the present invention at greater than about 1050° C. It is preferred that the reaction temperature range from about 1050° C. to 1300° C. Above a temperature of about 1300° C., the system operation requires more oxygen input which reduces CO and $H_2$ yields. In addition, the high temperatures can cause undesirable rates of degradation of materials of construction. Below a reaction temperature of about 1050° C., there tends to be greater reactor instability that may involve carbon deposition or sulfidation of the catalyst 18. A more preferable reaction temperature range for this embodiment of the invention is between about 1050° C. to 1250° C.

Within the reaction zone 17 is disposed the catalyst 18 which serves to catalyze the step or act of partially oxidizing the feed 19. Although the catalyst 18 can vary, the preferred embodiment of the present invention contemplates that the catalyst comprises a noble metal supported on a porous alumina monolith. Thereby, the feed 19 enters the reaction zone 17 where it is contacted with the catalyst 18, with the contact being controlled by regulating the catalytic contact time. In large part, the contact time is controlled by the feed flow rate and configuration of the catalyst. A higher feed flow rate will decrease the contact time.

For the present embodiment of the invention, it is beneficial to maintain a liquid hourly space volume (LHSV) of greater than about $0.5\ h^{-1}$, and preferably in the range of about $0.5\ h^{-1}$ to $75\ h^{-1}$. LHSV is defined as the liquid hydrocarbon flow rate per unit volume of catalyst, with the catalyst volume defined as the volume occupied by the monolith. A more tortuous flow path created by the catalyst 18 increases the contact time. The duration of the contact time is controlled in order to maximize partial oxidation and minimize further oxidation of hydrogen and carbon monoxide. Contact time is defined based on volumetric flow rates computed at standard temperature and pressure (STP) as follows:

$$\text{Contact Time} = \frac{\text{Volume of the catalyst monolith (cc)} \times 1000}{\text{Flow rate of oxidizer gas} + \text{hydrocarbon vapor at } STP\ (cc/s)}$$

where the contact time is computed in milliseconds. The STP volumetric flow rate of hydrocarbon vapor is calculated by equating the hydrocarbon moles in the gas (vapor) phase to that in the liquid phase. Accordingly, for this embodiment of the invention, a useful contact time is not more than about 500 milliseconds. A preferred range of contact time is from about 10 to 500 milliseconds. More preferably, the contact time is about 50 to 200 milliseconds and, in particular, about 100 milliseconds. With a contact time of less than about 10 milliseconds, there is a tendency towards incomplete conversion. By limiting the contact time to about 500 milliseconds, the present embodiment of the invention can provide a catalyst zone that does not become too large and unwieldy, and will be able to provide a compact, lightweight, catalytic partial oxidation fuel processor.

As a result of the reaction parameters described above, the partial oxidation in the reaction zone produces a product gas 20 that can exit the reactor 13. The product gas 20 substantially comprises hydrogen gas, carbon monoxide, carbon dioxide, water vapor, hydrogen sulfide, methane, traces of unconverted hydrocarbons, traces of other sulfur compounds, and nitrogen, if the oxidizer gas is air or oxygen-enriched air.

Optionally, and following the step of recovering the product gas 20, a step or act of directing the product gas 20 to a fuel cell system 14 can occur. Any fuel cell system that has provisions to utilize the fuel content of the above detailed product gas stream can be employed. In this preferred embodiment, a solid oxide fuel cell system is contemplated as the fuel cell system 14. The fuel cell system 14 can be constructed according to well known methods in the art and can either have a sulfur tolerant design or, alternatively, have a provision for desulfurizing the product gas stream. Some examples of solid oxide fuel cells can be found in U.S. Pat. Nos. 4,913,982 and 4,379,109. With the solid oxide fuel cell systems 14 typically using carbon monoxide and hydrogen gas as its fuel, it can be appreciated that the product gas 20 serves to fuel the solid oxide fuel cell system 14.

EXAMPLE 1

Catalyst Preparation

The catalyst was prepared by impregnating the noble metal onto the surface of the open channel support structure. Rhodium on alpha alumina support was the catalyst used in obtaining the data described in the following examples and was prepared as discussed below. A soluble salt of the hydrated form of rhodium chloride was dissolved in de-mineralized water to make an aqueous solution with a concentration of rhodium of 10% by weight. The alumina support was prepared by baking in air at 500° C. for 2 hours. Using a microliter syringe, rhodium solution was then added dropwise to the alumina monolith support until the point of incipient wetness was reached. The catalyst was then dried in air at room temperature for 2 hours. The dried catalyst was then re-wetted (drop-wise) with rhodium chloride solution and re-dried. The process was repeated a few times depending on the extent of loading of the metal needed. Typically, five to six deposits of the 10% rhodium solution on a 100 mg alpha alumina support provided about 30 mg of rhodium (about 23 wt. % rhodium) catalyst. To obtain lower or higher loadings, less or more number of deposits are needed, while preferably keeping the rhodium concentration in the solution unchanged. The dried catalyst was then baked in a nitrogen stream at 800° C. for 10 hours.

The catalyst was held in place in a 0.5 ID quartz tube reactor using quartz wool to reduce feed bypass. Surrounding the catalyst were radiation shields. For the experiments detailed in the following examples, the radiation shields were in the form of zirconia reticulate plugs on either side of the catalyst monolith. The operating temperature of the catalyst bed was monitored by S-type (Pt/Pt—Rh) thermocouples that were positioned on both the front and the back face of the catalyst. The feed streams of the hydrocarbon and the oxidizer gas were vaporized and mixed in a mixer/vaporizer setup that consisted of 1 mm glass beads packed in a 0.5-inch ID, 12-inch long quartz tube heated to between 240° C.–260° C., preferably 250° C. The vapor mixture was delivered to the reactor at temperatures between 225° C.–250° C. through heated lines. The temperature of the furnace was then increased to start the partial oxidation reaction. Auto-ignition of the feed occured at about 300° C.–350° C., after which the role of the furnace was to minimize heat losses to the surroundings.

The composition of the gas mixture leaving the reactor was measured by gas chromatography equipped with TCD, FID and FPD (Thermal Conductivity, Flame Ionization and Flame Photometric Detector) detectors. The sulfur concentrations in the product streams were measurable at ppm levels and the sulfur peaks were resolved using a 0.53-mm bore, 60-m long Restek® column placed in a split configuration with the silica gel and molecular sieve columns that do permanent gas and hydrocarbon gas analysis. The sulfur concentrations were also monitored intermittently by independent measurements with Kitagawa® tube draw sample measurements. The GC was periodically calibrated with a standard gas mixture with composition similar to a typical product stream and the on-line analysis was complemented by frequent grab sample analysis. Water concentrations in the product stream were also confirmed by independent measurements by intermittent weight monitoring of the trapped condensate from the product gas stream using a combination of liquid nitrogen and dry-ice cooling traps. Mass balance checks were performed on carbon, hydrogen and oxygen and were 100±5% for all three species. For the experimental runs continuing for long periods, the hydrocarbon feed supply was switched between two ISCO® syringe pumps through a valve switching arrangement to provide uninterrupted fuel flow. Similar arrangement was made to the oxidizer gas supply when necessary to maintain a constant flow during the experiment.

Hydrocarbon Feed

The hydrocarbon source 11 was of several separate hydrocarbon sources in terms of carbon to hydrogen ratios, sulfur contents, and spread of carbon and hydrogen numbers. The sources were n-octane, surrogate fuel, surrogate fuel with about 500 ppm of benzothiophene, surrogate fuel with about 500 ppm of dibenzothiophene, JP-8 jet fuel without alteration, and JP-8 jet fuel with about 1000 ppm of dibenzothiophene. The composition of the surrogate fuel was intended to mimic a logistic fuel, particularly jet fuel in terms of carbon to hydrogen ratios, average molecular weight and heat content. The particular composition of the surrogate fuel is detailed in Table 1 below.

| Component | #C | #H | Mol. wt | B.P. (° C.) | Mole Frac. |
|---|---|---|---|---|---|
| 2,2,4-Trimethylpentane | 8 | 18 | 114.23 | 99 | 0.049 |
| Methylcyclohexane | 7 | 14 | 98.19 | 101 | 0.055 |
| m-Xylene | 8 | 10 | 106.17 | 139 | 0.057 |
| Cyclooctane | 8 | 16 | 112.22 | 151 | 0.062 |
| Decane | 10 | 22 | 142.29 | 174 | 0.173 |
| Butylbenzene | 10 | 14 | 134.22 | 183 | 0.054 |
| 1,2,4,5-Tetramethylbenzene | 10 | 14 | 134.22 | 197 | 0.049 |
| 1,2,3,4-Tetrahydronaphthalene | 10 | 12 | 132.21 | 207 | 0.048 |
| Dodecane | 12 | 26 | 170.34 | 216 | 0.203 |
| 1-Methylnaphthalene | 10 | 10 | 142.2 | 243 | 0.038 |
| Tetradecane | 14 | 30 | 198.4 | 254 | 0.130 |
| Hexadecane | 16 | 34 | 226.45 | 287 | 0.083 |

The JP-8 fuel was commercially obtained and tested for sulfur content showed a total maximum sulfur content of less than about 0.01 wt. %.

Process Parameters

Each of the hydrocarbons underwent testing while varying three different parameters. The C/O ratios were varied between 0.5 and 1.2; the rhodium loadings were varied between 5 wt. % and 30 wt. %; and the reaction temperatures were varied between 1050° C. and 1300° C. Feed flow rates were varied from 0.01 ml/min and 3.0 ml/min, which translates to LHSVs of 5 $h^{-1}$ to 750 $h^{-1}$ and contact time ranges of 10 to 500 milliseconds. A series of traps and condensers were used to allow for almost complete condensation and collection of the product gas 20 and unconverted hydrocarbons. A HP5890 Series II gas chromatograph and a SRI 8610 Series C were used for analysis of the product gas 20. An 18"×0.5" stainless steel tube filled with 1 mm glass beads was installed upstream of the quartz reactor 13 to provide sufficient feed 19 mixing. An air-injected vacuum pump was connected to the sample outlet. This provided for a constant amount of sample being drawn to a GC sample loop.

The percentage yields in FIGS. 3–7 are defined as follows:

$$CO\ Yield\ (\%) = \frac{100 \times \text{Molar flow rate of carbon monoxide in product gas (mol/s)}}{\text{Molar flow rate of carbon atoms in the feed (mol/s)}}$$

$$H_2\ Yield\ (\%) = \frac{100 \times 2 \times \text{Molar flow rate of hydrogen molecules in product gas (mol/s)}}{\text{Molar flow rate of hydrogen atoms in the feed (mol/s)}}$$

EXAMPLE 2

Tests were conducted to confirm the efficacy of the system 10 using the catalyst preparation and process method described in Example 1. A factorial 'Design of Experiments' study with octane and surrogate fuel allowed a systematic study of the entire parameter space and the definition of optimum parameter set. For the surrogate fuel, a C/O ratio of 0.8, rhodium loading of 7 wt. % and a reaction temperature of 1100° C. produced a stable, extended operation with CO yields at about 90% and hydrogen yields at about 80%.

EXAMPLE 3

Figure 3:
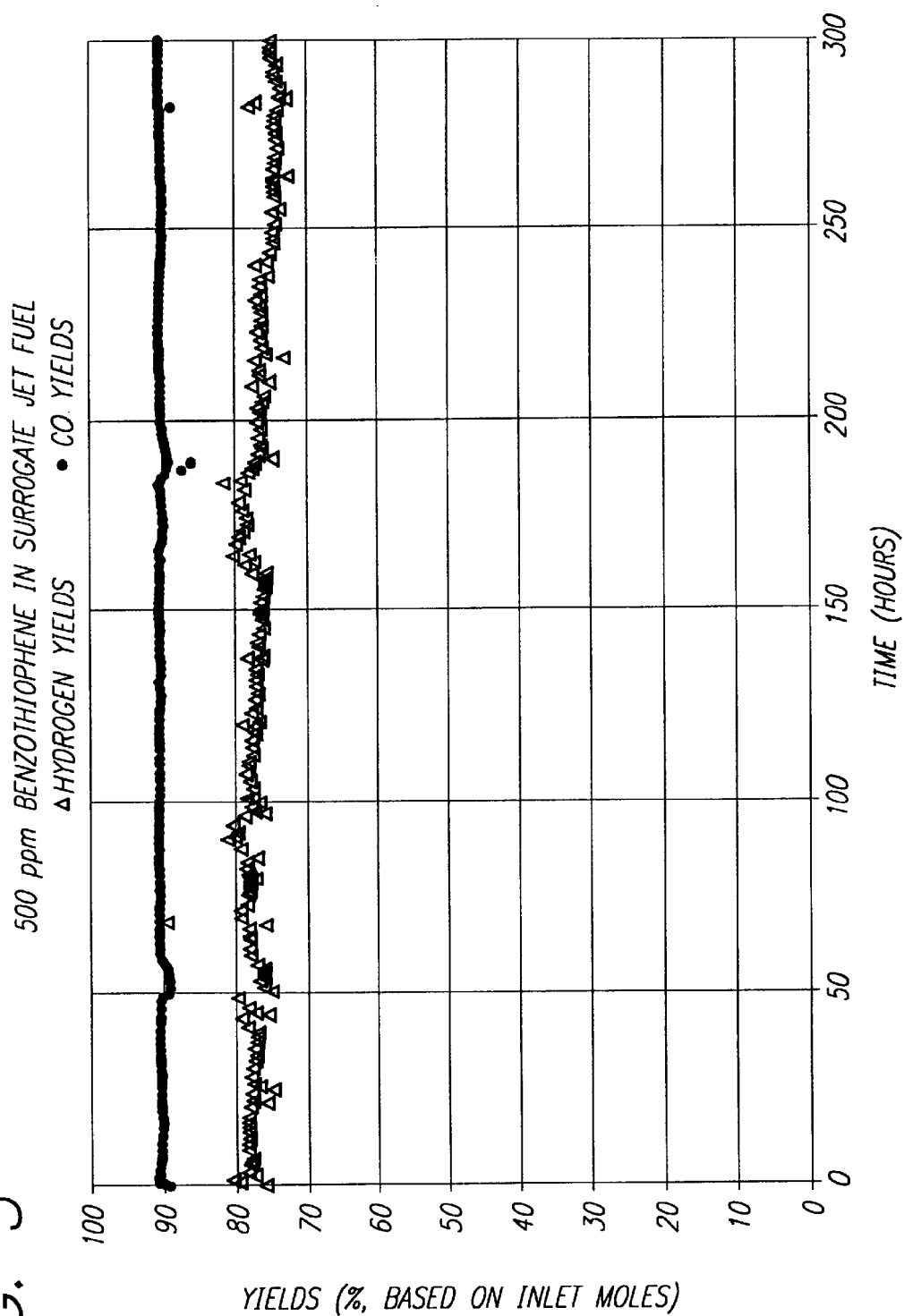
FIG. 3 is a graph depicting percentage product yield v. time according to an embodiment of the present invention wherein 500 ppm benzothiophene is present in a surrogate fuel which is a feed.

Following the catalyst preparation and the process methods described in Example 1, the efficacy of the system 10 was tested using a hydrocarbon feed of surrogate fuel with 500 ppm benzothiopehene and an oxidizer gas comprising a mixture of 20% oxygen and 5% argon, balance helium. FIG. 3 is a plot of product percentage yield versus time for the 500 ppm benzothiophene in surrogate fuel. The C/O ratio was 0.8, the rhodium loading was 7.0 wt. %, the contact time was 50 milliseconds, and the catalytic temperature was 1150° C. FIG. 3 shows that for over a period of about 300 hours there was a substantially steady-state carbon monoxide production yield of about 90%. The hydrogen gas yield was about 80%.

EXAMPLE 4

Figure 4:
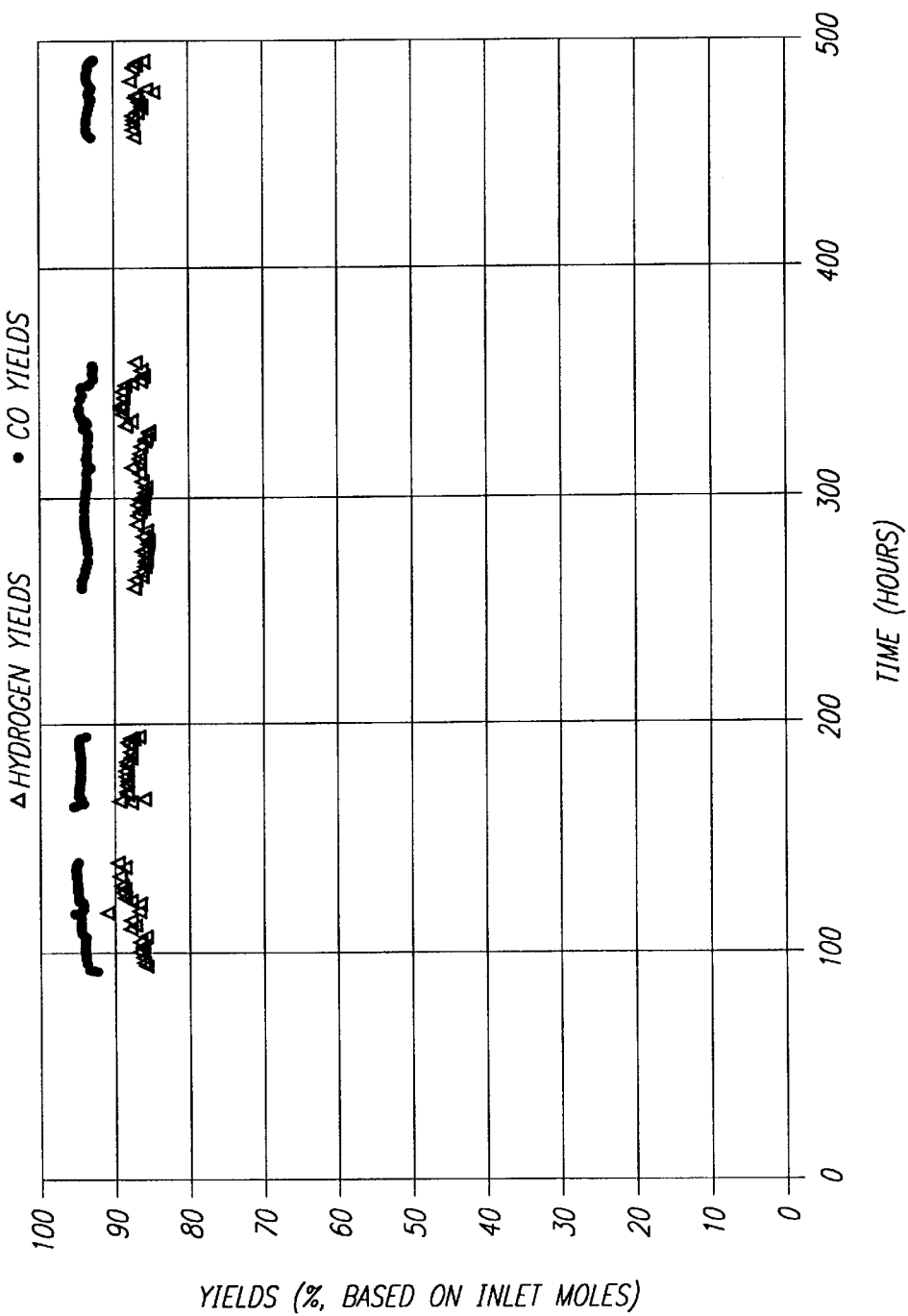
FIG. 4 is a graph depicting percentage product yield v. time according to an embodiment of the present invention wherein 500 ppm dibenzothiophene is present in a surrogate fuel which is a feed.

The efficacy of the system 10 was tested using the same procedures described in Example 3, with the exception that the hydrocarbon feed supply was surrogate fuel with the sulfur present as 500 ppm dibenzothiophene. FIG. 4 is a plot of product percentage yield versus time for the 500 ppm dibenzothiophene in surrogate fuel. The C/O ratio was 0.8; the rhodium loading was 21 wt. %; the contact time was 100 milliseconds; and the catalytic temperature was 1150° C. FIG. 4 shows that for over a period of about 500 hours there was a substantially steady-state carbon monoxide production yield of about 95%. The hydrogen gas yield was about 87%. The test was started with the oxidizer source as laboratory air and then switched to a mixture of 20% oxygen, 5% argon, balance helium after about 90 hours of operation. Also, during the rest of the experiment, the source of the oxidizer gas was repeatedly switched back and forth between the gas mixture and laboratory air indicated in FIG. 4 by gaps in data acquisition during the times when the oxidizer source was laboratory air. Despite the oxidizer gas switches, the performance was substantially undiminished. Since the product quantification and GC analysis for this experiment was based on using argon as internal standard, the periods of reactor operation with laboratory air could not be calibrated on the same basis as operation under synthetic air. However, the peak areas of all the product species were monitored throughout the experiment and were found to be relatively unaltered after the switches in the oxidizer source, indicating continuous, stable performance of the CPOX reactor system. Thus the differences in the properties of the inerts (helium+argon vs. nitrogen) such as viscosity, thermal conductivity, chemical reactivity etc. were found not to change the stability of operation of the system 10.

EXAMPLE 5

Figure 5:
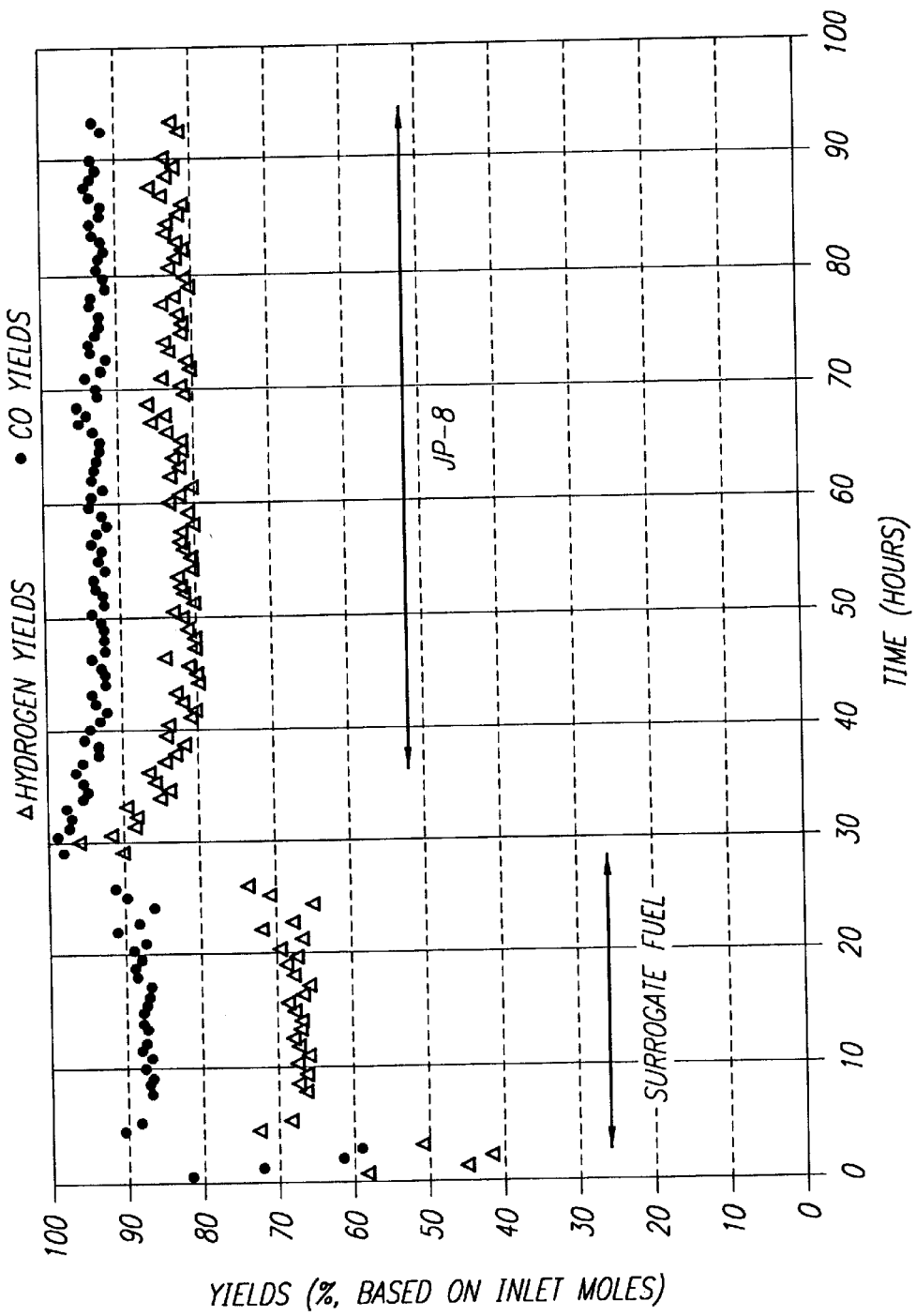
FIG. 5 is a graph depicting percentage product yield v. time according to an embodiment of the present invention wherein both surrogate fuel with 500 ppm dibenzothiophene and commercial JP-8 jet fuel is a feed.

Following the same procedures described in Example 3, with the exceptions that the hydrocarbon feed supply included both the surrogate jet fuel with 500 ppm dibenzothiophene, as well as the JP-8 jet fuel, and the oxidizer gas used was laboratory air, the efficacy of the system 10 was tested. FIG. 5 is a plot of product percentage yield versus time for the experiment that started with the surrogate fuel as the hydrocarbon feed and after about 26 hours into the experiment, the hydrocarbon feed was switched to JP-8 fuel. The C/O ratio, rhodium loading, contact time, and catalytic temperature was the same as for FIG. 4. After an initial period of stabilization over about the first 8 hours, the system showed no significant signs of variability until the hydorcarbon feed was switched to JP-8 jet fuel. Responding to the change in C—H makeup in the feed and also probably to lower sulfur content of the JP-8 (about 83 ppm), the efficacy of the system 10 to produce carbon monoxide and hydrogen by partial oxidation improved. Steady-state carbon monoxide and hydrogen gas production yield of about 90–93% and 80–85%, respectively, were obtained. Other tests with JP-8 fuel showed this performance could be extended past 500 hours.

Figure 6:
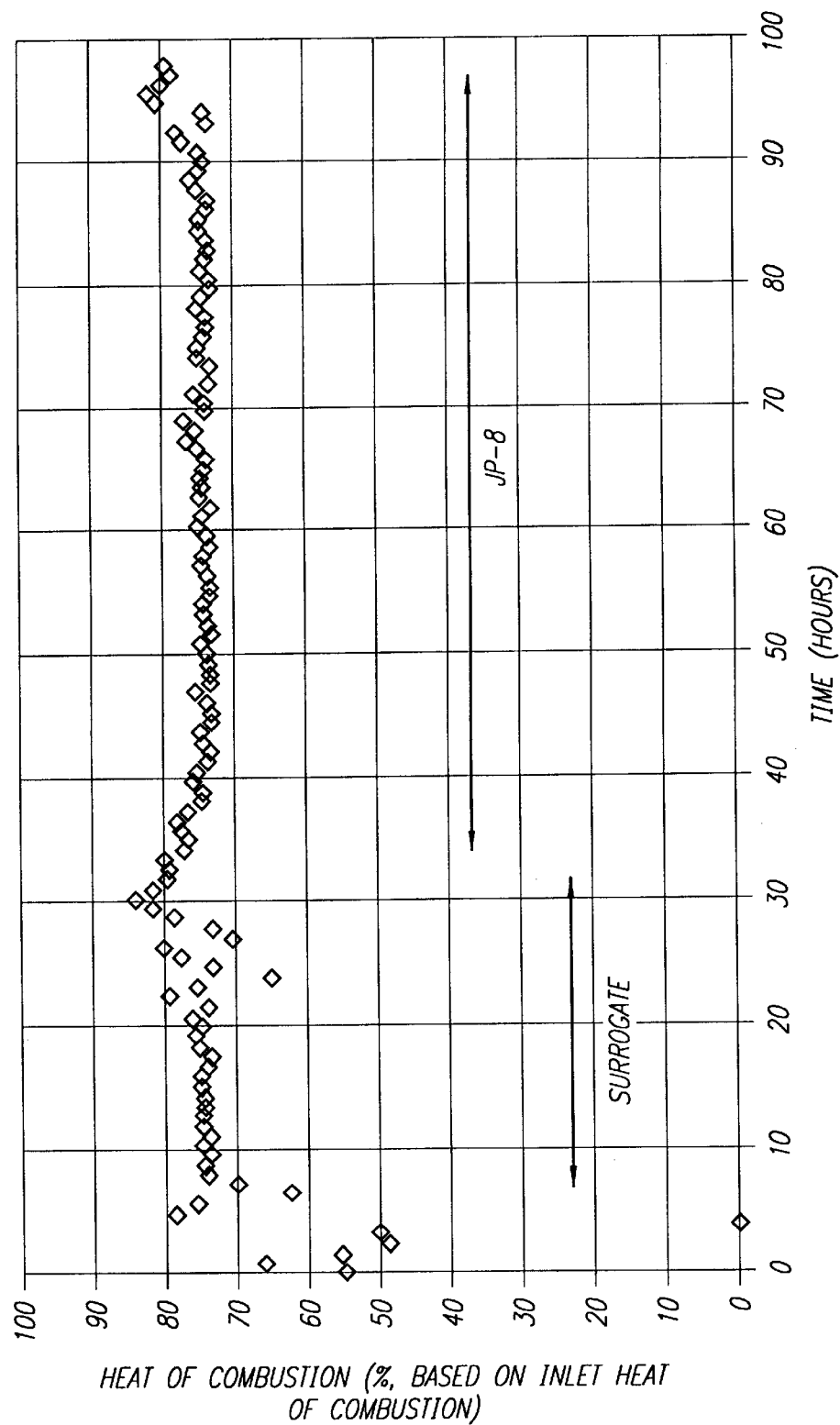
FIG. 6 is a graph depicting percentage product heat of combustion v. time according to an embodiment of the present invention wherein both surrogate fuel with 500 ppm dibenzothiophene and commercial JP-8 jet fuel is a feed.

FIG. 6 is a plot of product heat of combustion yield versus time for the JP-8 fuel tested in FIG. 5. Over a period of about 100 hours a substantially steady-state heat of combustion yield of about 75% was obtained. The heat of combustion yield is based on the lower heating values (i.e., energy release during conversion of a substance into $CO_2$ and $H_2O$, without including the latent heat of vaporization of water) defined as follows:

$$\text{Heat of Combustion (\%)} = \frac{\text{Lower heating value of } (CO + H2) \text{ in product gas}}{\text{Lower heating value of JP-8 Jet fuel (feed)}} \times 100$$

EXAMPLE 6

Figure 7:
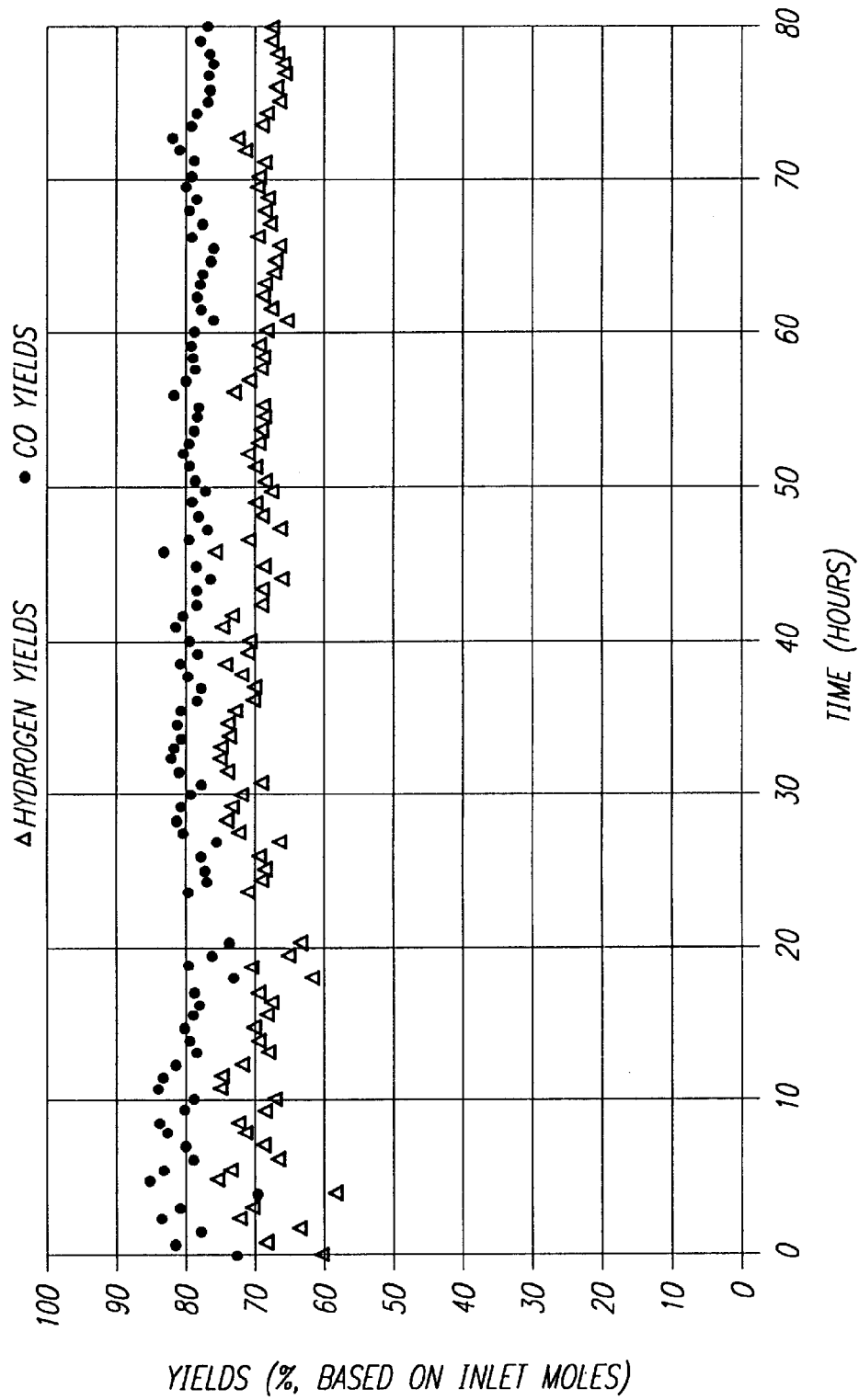
FIG. 7 is a graph depicting percentage product yield v. time according to an embodiment of the present invention wherein 1000 ppm dibenzothiophene is present in JP-8 jet fuel which is a feed.

The efficacy of system 10 was tested following the same procedural details discussed in Example 3, with the exceptions that the hydrocarbon feed source was JP-8 with the sulfur component being 1000 ppm of dibenzothiophene and oxidizer gas being laboratory air. FIG. 7 is a plot of product percentage yields of carbon monoxide and hydrogen versus time for 1000 ppm dibenzothiophene added to JP-8 jet fuel. The C/O ratio was 0.8; the rhodium loading was 25 wt. %; the contact time was 100 milliseconds; and the catalytic temperature was 1220° C. FIG. 7 shows that under the prescribed process conditions, the CPOX fuel processor generated substantially steady-state carbon monoxide production yield between about 70% to 80%. The hydrogen gas yield was about 70%. The test was conducted to test the system 10 under conditions of excessive sulfur concentrations in the feed. Experiments with 1000 ppm dibenzothiophene in JP-8 such as discussed above were continued for some cases for times exceeding 300 hours, thereby establishing the robustness of the system 10 to fluctuating sulfur content in the hydrocarbon feed stream.

EXAMPLE 7

To compare the efficacy of the system 10 to the one that is essentially the same, with the exception that there is no rhodium on the open channel structure, blank reactor experiments were performed following the procedures described in Example 3. The reactor housed a alumina monolith (without any rhodium on it) surrounded by the zirconia reticulate radiation shields described in Example 3 and was subjected to the same test conditions of feed flow rate and temperature as were the catalytic partial oxidation experiments. For the range of C/O combinations in the feed from 0.5 to 1.0, and for the temperature range under investigation (1050° C.–1300° C.), the blank reactor showed lower selectivities to partial oxidation products. For these blank experiments, carbon monoxide yields were between 60% to 70% and hydrogen yields were between 40–55%, respectively. Furthermore, there was incomplete conversion of hydrocarbons and a majority of sulfur in the feed stream was not converted to hydrogen sulfide, as was the case with the catalytic system 10. The blank reactor operation was often limited to less than 10 hours of continuous operation by which time carbon and uncoverted hydrocarbon deposits on the catalyst and on reactor walls would force a shutdown of the experiment. These blank reaction experiments validate the efficacy of the catalytic partial oxidation system 10 to process heavy hydrocarbons.

For the experiments described in Examples 1–6 where the liquid hydrocarbon feed was processed by catalytic partial oxidation, the ranges of process conditions defined in this invention result in essentially carbon free operation. Carbon balances are in good agreement between the inlet and exit streams, and even for those experimental runs that extended for times exceeding several hundred hours stable operation, we do not see carbon losses. In addition, visual observations of the reactor setup indicate only very minimal deposits of any unconverted hydrocarbons during the extended, which is in contrast to the blank experiments described in Example 7. The invention therefore claims that for the conditions prescribed for catalytic partial oxidation process of heavy hydrocarbons results in minimal carbon deposition.

As can be appreciated by those skilled in the art, the present invention provides an improved method of CPOX and method of effectively supplying a fuel to a solid oxide fuel cell system. Also provided is a hydrocarbon processing system that operates in the substantial absence of water/steam to simplify the system design. The present invention additionally provides a method of converting heavy hydrocarbons having a number of carbons in excess of five and a method of processing hydrocarbons having a substantial sulfur component that can approximate more than about 50 ppm. At the same time, the CPOX process according to the present invention operates without having to desulfurize the feed prior to partially oxidizing the feed in the presence of a noble metal catalyst. The present invention also provides the above advantages with a minimal amount of carbon formation. Also, the present invention provides for CPOX processing over an extended period of time, while maintaining a desired steady-state yield efficiency. Furthermore, the defined process and the parameter ranges specified in the invention provide for a light-weight, compact, heavy hydrocarbon fuel processing system.

It should be understood, of course, that the foregoing relates to preferred embodiments of the invention and that modifications may be made without departing from the spirit and scope,of the invention as set forth in the following claims.

We claim:

1. A process for substantially only catalytically partially oxidizing heavy hydrocarbons comprising:
    (a) providing a feed gas mixture comprising an oxygen containing gas and a heavy hydrocarbon fuel having a sulfur content, said mixture being characterized by an atomic carbon to atomic oxygen ratio of between about 0.5 to 1.0;
    (b) providing a catalytic structure comprising a noble metal supported on an open-channel support, said noble metal being present between about 5 to 30 wt. %; and
    (c) passing said feed gas mixture through said catalytic structure in the substantial absence of steam being added to said feed gas mixture, said catalytic structure being maintained at a temperature greater than about 1050° C. to produce an exit gas stream containing hydrogen and carbon monoxide as main reaction products, wherein said hydrogen and carbon monoxide each have a yield of at least about 80%.

2. The process of claim 1, wherein said heavy hydrocarbon fuel comprises a plurality of hydrocarbon molecules, with substantially all of said molecules each containing at least 6 carbon atoms.

3. The process of claim 1, wherein said heavy hydrocarbon fuel is selected from the group consisting of gasoline, kerosene, jet fuel, and diesel fuel.

4. The process of claim 1, wherein said sulfur content of said heavy hydrocarbon fuel is greater than about 50 parts per million by weight.

5. The process of claim 1, wherein said noble metal is selected from the group consisting of Rh, Pt, Pd, and Ir.

6. The process of claim 1, wherein said noble metal is Rh.

7. The process of claim 1, wherein said oxygen containing gas comprises air.

8. The process of claim 1, wherein said oxygen containing gas comprises air with an enriched oxygen content.

9. The process of claim 1, wherein a catalyst contact time in said catalytic structure is not greater than about 500 milliseconds and a liquid hourly space velocity in said catalytic structure is greater than about 25 $h^{-1}$.

10. The process of claim 1, wherein said open-channel support comprises a ceramic monolith.

11. The process of claim 1, wherein said open-channel support comprises a porous alumina monolith.

12. The process of claim 1, wherein said open-channel support comprises a ceramic-coated metallic monolith.

13. The process of claim 1, wherein said catalytic structure is selected from the group consisting of a noble metal mesh and a noble metal coating on a metallic mesh.

14. A process for substantially only catalytically partially oxidizing heavy hydrocarbons comprising:

(a) providing a feed gas mixture comprising an oxygen containing gas and a heavy hydrocarbon fuel having a sulfur content, said feed gas mixture being essentially free of water and characterized by an atomic carbon to atomic oxygen ratio between about 0.5 to 1.0;

(b) providing a catalytic structure comprising a noble metal supported on an open-channel support, said noble metal being present between about 5 to 30 wt. %;

(c) passing said feed gas mixture through said catalytic structure in the substantial absence of steam being added to said feed gas mixture, the step of passing said feed gas mixture occuring at a liquid hourly space velocity greater than about 25 $h^{-1}$, said catalytic structure being maintained at a temperature greater than about 1050° C.; and (d) producing reaction products characterized by a carbon monoxide yield and a hydrogen yield each of at least about 80%, whereby said process deposits less than about 1 atom % of total carbon in said hydrocarbon fuel as elemental carbon and carbon-rich compounds.

15. The process of claim 14, wherein said hydrocarbon fuel comprises a plurality of hydrocarbon molecules, with substantially all of said molecules each containing at least 6 carbon atoms.

16. The process of claim 14, wherein said hydrocarbon fuel is selected from the group consisting of gasoline, kerosene, jet fuel, and diesel fuel.

17. The process of claim 14, wherein said sulfur content of said heavy hydrocarbon fuel is greater than about 50 parts per million by weight.

18. The process of claim 14, wherein said noble metal is selected from the group consisting of Rh, Pt, Pd, and Ir.

19. The process of claim 14, wherein said noble metal is Rh.

20. The process of claim 14, wherein said oxygen containing gas comprises air.

21. The process of claim 14, wherein said oxygen containing gas comprises air with an enriched oxygen content.

22. The process of claim 14, wherein a catalyst contact time in said catalytic structure is not greater than about 500 milliseconds.

23. The process of claim 14, wherein said open-channel support comprises a ceramic monolith.

24. The process of claim 14, wherein said open-channel support comprises a porous alumina monolith.

25. The process of claim 14, wherein said open-channel support comprises a ceramic-coated metallic monolith.

26. The process of claim 14, wherein said catalytic structure is selected from the group consisting of a noble metal mesh and a noble metal coating on a metallic mesh.

27. A method for supplying a product gas mixture comprising hydrogen and carbon monoxide to a solid oxide fuel cell system, said product gas mixture being produced by a process of substantially only catalytic partial oxidation of heavy hydrocarbons comprising the steps of:

(a) providing a feed gas mixture comprising an oxygen containing gas and a heavy hydrocarbon fuel having a sulfur content, said feed gas mixture being characterized by an atomic carbon to atomic oxygen ratio of between about 0.5 to 1.0;

(b) providing a catalytic structure comprising a noble metal supported on an open-channel support, said noble metal being present between about 5 to 30 wt. %; and (c) passing said feed gas mixture through said catalytic structure, said catalytic structure being maintained at a temperature greater than about 1050° C.;

(d) producing said product gas mixture that is characterized by a carbon monoxide yield and a hydrogen yield each of at least about 80%;

(e) directing said product gas mixture to said solid oxide fuel cell system.

28. A method for supplying a product gas mixture comprising hydrogen and carbon monoxide to a solid oxide fuel cell system, said product gas mixture being produced by a process of substantially only catalytic partial oxidation of heavy hydrocarbons comprising the steps of:

(a) providing a feed gas mixture comprising an oxygen containing gas and a heavy hydrocarbon fuel having a sulfur content, said feed gas mixture being substantially free of water and characterized by an atomic carbon to atomic oxygen ratio of between about 0.5 to 1.0;

(b) providing a catalytic structure comprising a noble metal supported on an open-channel support, said noble metal being present between about 5 to 30 wt. %; and (c) passing said feed gas mixture through said catalytic structure at a liquid hourly space velocity greater than about 25 $h^{-1}$, said catalytic structure being maintained at a temperature greater than about 1050° C.;

(d) producing said product gas mixture that is characterized by a carbon monoxide yield and a hydrogen yield each of at least about 80%;

(e) directing said product gas mixture to said solid oxide fuel cell system, whereby said process deposits less than about 1 atom % of total carbon in said hydrocarbon fuel as elemental carbon and carbon-rich compounds.

* * * * *